United States Patent [19]

Bickman

[11] 3,898,889

[45] Aug. 12, 1975

[54] GAS-OPERATED UNCAGING MECHANISM

[75] Inventor: Bernard F. Bickman, New Brighton, Minn.

[73] Assignee: The United States of America as represented by the Secretary of the Army, Washington, D.C.

[22] Filed: Mar. 21, 1974

[21] Appl. No.: 453,478

[52] U.S. Cl. ............... 74/5.12; 74/5.14; 74/5.7
[51] Int. Cl. ............... G01c 19/24; G01c 19/26
[58] Field of Search ............ 74/5.12, 5.14, 5.1, 5.7; 46/50

[56] References Cited
UNITED STATES PATENTS

| | | | |
|---|---|---|---|
| 2,415,899 | 2/1947 | Meyer et al. | 74/5.12 |
| 2,924,104 | 2/1960 | Friedman | 74/5.12 |
| 3,186,241 | 6/1965 | Blanding et al. | 74/5.7 X |

*Primary Examiner*—Charles J. Myhre
*Assistant Examiner*—William C. Anderson
*Attorney, Agent, or Firm*—Robert P. Gibson; Nathan Edelberg; Herbert H. Murray

[57] ABSTRACT

A caging plunger engages a notch in the gyro gimbal to cage the rotor in the null roll and pitch positions. A latching plunger holds the caging plunger in position against the uncaging spring by use of a tight friction fit of the latching plunger in its bore. When the gyro is fired, spinup gas pressure directed between the caging plunger and the latching plunger displaces the latching plunger while holding the caging plunger in position against the uncaging spring. After spinup, the pressure between the plungers decreases to allow the uncaging spring to retract the caging plunger, thus uncaging the gyro rotor.

1 Claim, 1 Drawing Figure

3,898,889
PATENTED AUG 12 1975
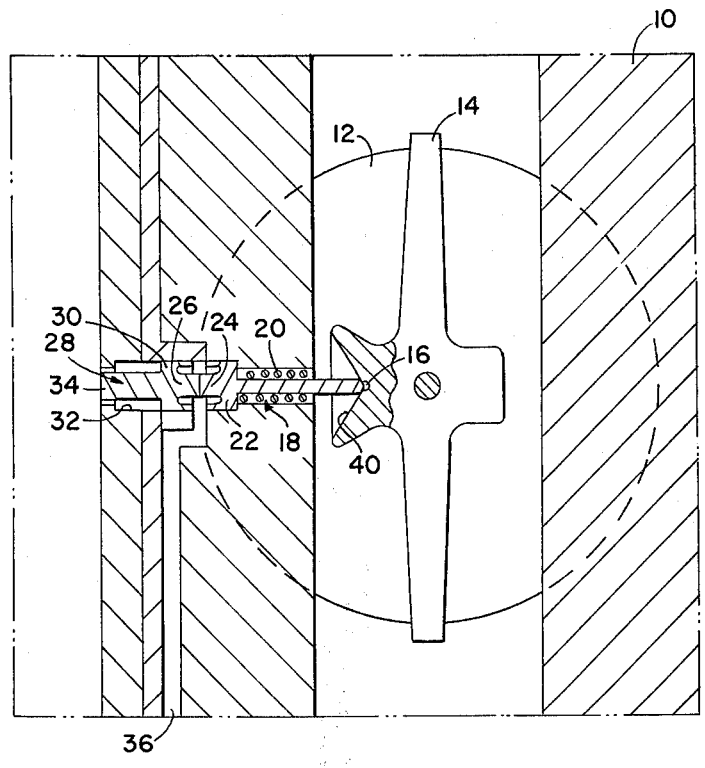

GAS-OPERATED UNCAGING MECHANISM

BACKGROUND OF THE INVENTION

Many different caging and uncaging mechanisms have been used with gyros with varying degrees of success.

It is an object of this invention to provide an uncaging mechanism which relies on the pressure of the spinup gas to provide the uncaging action.

BRIEF DESCRIPTION OF THE DRAWING

The single FIGURE of the drawing illustrates the uncaging mechanism of the present invention.

DETAILED DESCRIPTION OF THE INVENTION

Referring now to the drawing, 10 indicates a gyro housing. Within the housing 10 is a rotor 12 mounted for rotation in a wiper ring or gimbal 14. The gimbal 14 is provided with a funnel shaped notch 16.

A caging pin 18 is slideably mounted in housing 10 and projects into the notch 16. An uncaging spring 20 surrounds the inner end of pin 18 and abuts an enlarged portion 22 of pin 18 to urge the pin outward away from its cage position. Beyond the enlarged portion 22, pin 18 is provided with an outwardly extending stem 24 which abuts a similar inwardly extending stem 26 on a locking pin 28. The locking pin 28 has an enlarged portion 30 which is a friction fit within a bore 32 formed in the housing 10. Outwardly of the enlarged portion 30 the pin 28 is provided with a stem 34 which projects outside of the housing 10 when the gimbal 14 is uncaged.

A passageway 36 is formed in the housing 10 and communicates with the area between the enlarged portions 22 and 30 of the pins 18 and 28, respectively. The other end of the passageway 36 communicates with the source of gas pressure (not shown) used to spin up the gyro rotor.

In the operation of the device, with the gyro caged, the parts will be in the positions illustrated. When the gyro is fired the high pressure gas used to spin up the rotor is admitted between the enlarged portions 22 and 30 forcing the pin 28 outwardly while maintaining the pin 18 in its cage position against the pressure of spring 20. As the rotor builds up speed the gas pressure begins to decay. When the rotor reaches operating speed the gas pressure declines to the point where the spring 22 moves the caging pin 18 outwardly to release the gimbal 14.

If it is desired to recage the gyro the housing 10 is rotated until the notch 16 is relatively aligned with the caging pin 18 and the pin 28 is pressed inwardly to force the caging pin 18 into the notch 16. The sloping sides 40 of the funnel shaped notch 16 facilitate this operation.

I claim:

1. In a gyro having a housing, a gimbal structure and a rotor mounted in the gimbal; a caging mechanism comprising:

a funnel shaped notch in said gimbal, a caging pin slideably mounted in said housing and adapted to project inwardly into said notch, a spring surrounding said caging pin and normally urging said pin outwardly, a latching pin in alignment with said caging pin and slideably mounted with a friction fit in said housing, the inner end of said latching pin abutting the outer end of said caging pin, the outer end of said latching pin extending through said housing, both of said forementioned pins being provided with enlarged portions intermediate their ends slideably received in a tubular chamber in said housing thus providing an annular gas chamber between said enlarged portions, and a gas passageway in said housing communicating at one end with said annular gas chamber and at its other end with a source of spinup gas pressure, whereby admission of gas pressure to said annular gas chamber forces said latching pin outwardly while maintaining said caging pin in engagement with said notch, decline of said gas pressure permitting said caging pin to move outwardly under the influence of said spring to uncage the mechanism of said gyro.

* * * * *